3,275,600
POLYMERIC ORGANOBORON COMPOUNDS
Joseph G. Bower, Orange, Calif., assignor to United States Borax & Chemical Corporation, Los Angeles, Calif., a corporation of Nevada
No Drawing. Filed Jan. 15, 1962, Ser. No. 166,423
5 Claims. (Cl. 260—47)

The present invention relates as indicated to a new class of polymeric organoboron compounds and has further reference to a method for preparing these polymeric compounds.

Various polymeric organoboron compounds are known, and have created a great deal of interest due to their high degree of thermal stability. However, prior to the present invention, the utility of the previously known polymeric organoboron compounds has been very limited because of their relative instability in the presence of water.

It is, therefore, the principal object of the present invention to provide a new class of hydrolytically stable polymeric organoboron compounds.

It is a further object of this invention to provide an efficient and economically desirable means for preparing these new polymeric organoboron compounds.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the many ways in which the principle of the invention may be employed.

Broadly stated, the present invention comprises polymeric organoboron compounds having the recurring structural unit

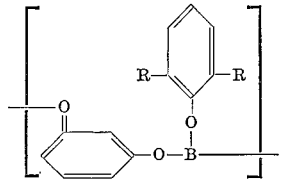

where R is a tertiary alkyl radical.

As shown in the foregoing broadly stated paragraph, it is essential that the pendant phenoxy groups of the recurring structural unit of the present polymeric organoboron compounds be substituted at the 2- and 6-positions with tertiary alkyl radicals. It is the substitution of the tertiary alkyl radicals at both the 2- and 6-positions of the phenoxy group which renders the present polymeric compounds hydrolytically stable. Primary or secondary alkyl radicals substituted at these positions will not effectively stabilize the polymeric compounds, and a single tertiary alkyl radical at the 2-position of the phenoxy group does not lead to hydrolytic stability. Moreover, little or no hydrolytic stability is provided by even a plurality of tertiary alkyl substituents which are located at any positions on the phenoxy group that does not include both the 2-position and the 6-position.

While the compounds of the present invention are particularly characterized by the described substitution of tertiary alkyl radicals at the 2- and 6-positions of the phenoxy group, it is to be noted here that the phenoxy group may be further substituted at the 3-, 4-, and/or 5-positions. The substituents can be primary alkyl radicals, secondary alkyl radicals, phenyl radicals, alkoxy radicals, halogens, etc. Such substituents, however, are relatively unimportant to the present invention since they do not appreciably affect the hydrolytic or thermal stability of the polymeric compounds.

The present polymeric compounds can be prepared as both liquids or solids, and in either state they are substantially stable in the presence of water.

The polymeric organoboron compounds of the present invention will find a wide variety of industrial applications. They can be used as molding and casting resins; they can be used as adhesives and as active ingredients in the preparation of adhesive compositions; and they can also be used as binders in the preparation of fiberglass laminates. They will be found to have further utility as additives in lubricating oils and greases, as neutron absorbing materials, and as protective coatings.

The preparation of the present polymeric organoboron compounds can best be illustrated by the following equation:

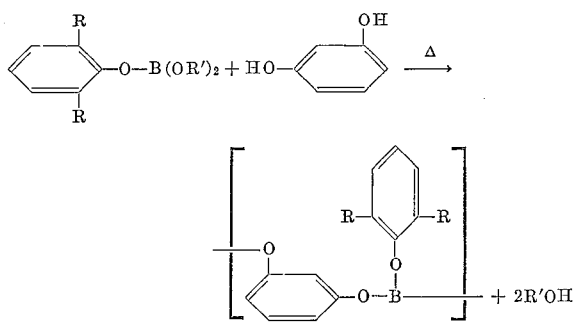

where R is a tertiary alkyl radical and R' is an alkyl radical.

The preferred method for performing the above polymerization reaction is a direct single-step process. Equimolar amounts of the reactants are combined and heated under reflux. The alcohol produced in the reaction is then removed by distillation and the desired product is recovered as the pot residue. The product, a viscous yellow to brown liquid when heated for a short period of time at temperatures above about 250° C. becomes a solid brown resin.

As regards the reactants applicable to the present invention, the first of these, the dihydroxy phenyl compound, is resorcinol, a well known and readily available compound. The second reactant is a member of a group of compounds referred to in the art as the hindered phenolic borate esters which are also well known and commercially available compounds.

The hindered phenolic borate esters applicable to the present invention have the formula

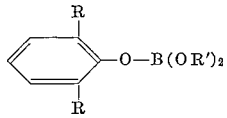

where R is a tertiary alkyl radical and R' is an alkyl radical. These reactants are characterized by the tertiary alkyl substituents at the 2- and 6-positions on the phenoxy group as are the polymeric products, and they can also be substituted at the 3-, 4-, and 5-positions with such substituents as, for example, primary, secondary or tertiary alkyl radicals, phenyl radicals, hydrogen, alkoxy radicals, halogens, etc. In the preferred embodiment of the invention I use hindered phenolic borate esters where R is a tertiary alkyl radical of from 4 to 10 carbon atoms and R' is an alkyl radical of from 1 to 8 carbon atoms.

The following list is illustrative of the hindered phenolic borate ester reactants applicable to the present invention:

2,6-di-t-butylphenyl di-n-octyl borate
2,6-di-t-amylphenyl di-n-heptyl borate
2,6-di-t-hexylphenyl dimethyl borate
2,6-di-t-decylphenyl diethyl borate
2,6-di-t-octylphenyl di-n-hexyl borate
2,4,6-tri-t-butylphenyl di-n-butyl borate
2,6-di-t-hexyl-3,4-diethylphenyl diisoamyl borate
2,6-di-t-hexyl-4-n-octylphenyl di-n-propyl borate
2,6-di-t-amyl-3,4-dimethylphenyl diisopropyl borate
2,6-di-t-octyl-4-isobutylphenyl diethyl borate
2,6-di-t-butyl-4-methylphenyl di-n-propyl borate
2,4,6-tri-t-amylphenyl di-n-butyl borate
2,6-di-t-butyl-4-methylphenyl diisopropyl borate
2,6-di-t-butylphenyl di-n-butyl borate
2,6-di-t-amyl-3,4,5-trimethylphenyl diethyl borate It is to be clearly understood that the foregoing list is only a partial enumeration of the hindered phenolic borate esters applicable to the present invention and is not intended to limit the invention.

So that the present invention can be more clearly understood, the following examples are given for illustrative purposes:

I. A mixture of 3.0 grams (0.0272 mole) of resorcinol and 9.86 grams (0.0272 mole) of 2,6-di-t-butylphenyl di-n-butyl borate was placed in a 100 ml. round-bottomed flask fitted with a reflux condenser. The mixture was heated under reflux for about 4 hours at which time 2.75 grams (68.24% of theory) of n-butanol had been removed. The flask and its contents were allowed to cool, and the product, a viscous, yellow, polymeric liquid, was recovered. Chemical analysis of the product yielded the following data.

Calculated for $C_{20}H_{25}BO_3$: B=3.34%. Found in product: B=3.01%.

II. A portion of the product from Example I was then heated at about 300° C. for about 3 hours, and a solid amber colored resin was recovered. Chemical analysis of this solid product yielded the following data.

Calculated for $C_{20}H_{25}BO_3$: B=3.34%. Found in product: B=3.04%.

III. A mixture of 3.0 grams (0.0272 mole) of resorcinol and 9.48 grams (0.0272 mole) of 2,6-di-t-butyl-4-methylphenyl di-n-propyl borate was placed in a 100 ml. round-bottomed flask fitted with a reflux condenser. The mixture was then heated under reflux for about 3 hours at which time 3.04 grams (92.97% of theory) of n-propanol had been removed. The flask and its contents were allowed to cool, and the product, a viscous, brown polymeric liquid, was recovered. Chemical analysis of the product yielded the following data.

Calculated for $C_{21}H_{27}BO_3$: B=3.20%. Found in product: B=3.08%.

IV. A portion of the product from Example III was then heated at about 300° C. for about 3 hours, and a solid dark brown resin was recovered. Chemical analysis of this solid product yielded the following data.

Calculated for $C_{21}H_{27}BO_3$: B=3.20%. Found in product B=3.12%.

V. A mixture of 3.0 grams (0.0272 mole) of resorcinol, and 8.33 grams (0.0272 mole) of 2,6-di-t-butylphenyl diethyl borate was placed in a 100 ml. round-bottomed flask fitted with a reflux condenser. The mixture was then heated under reflux for about 3 hours at which time 2.08 grams (82.87% of theory) of ethanol had been removed. The flask and its contents were then allowed to cool, and the product, a viscous, brown, polymeric liquid, was recovered. Chemical analysis of the product yielded the following data.

Calculated for $C_{20}H_{25}BO_3$: B=3.34%. Found in product: B=3.13%.

VI. A portion of the product from Example V was then heated at about 300° C. for about 3 hours, and a solid dark brown resin was recovered. Chemical analysis of the solid product yielded the following data.

Calculated for $C_{20}H_{25}BO_3$: B=3.34%. Found in product: B=3.19%.

As an example of the substantial hydrolytic stability of the present organoboron compounds, a weighed sample of the polymer from Example II was placed into 100 ml. of water and boiled for about 20 minutes. The sample showed no tendency to dissolve in the water. The resin was then removed by filtration and the filtrate was analyzed for boron content. It was found that only about 0.5% of the sample had hydrolyzed when in contact with water at 100° C. for 20 minutes. That value is typical of the present polymeric organoboron compounds.

Other modes of applying the principle of the invention may be employed, change being made as regards the details described, provided the features as stated in any of the following claims or the equivalent of such be employed.

I, therefore, particularly point out and distinctly claim as my invention:

1. Polymeric organoboron compounds having the recurring structural unit

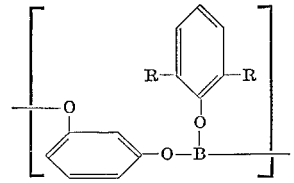

where R is a tertiary alkyl radical of from 4 to 10 carbon atoms.

2. A polymeric organoboron compound having the recurring structural unit

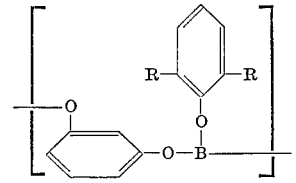

where R is a tertiary butyl radical.

3. A polymeric organoboron compound having the recurring structural unit

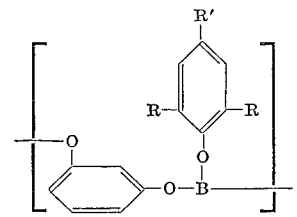

where R is a tertiary butyl radical and R' is a methyl radical.

4. The method for preparing polymeric organoboron compounds having the recurring structural unit

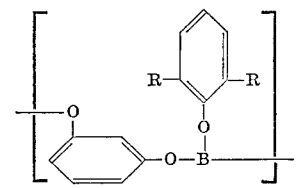

which comprises heating under reflux a hindered phenolic borate ester having the formula

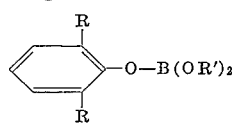

with resorcinol, removing the alcohol produced in the reaction by distillation, and recovering the desired product as the residue, where R is a tertiary alkyl radical and R' is an alkyl radical.

5. The method for preparing polymeric organoboron compounds having the recurring structural unit

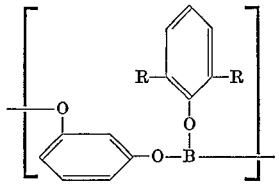

which comprises heating under reflux equimolar amounts of a hindered phenolic borate ester having the formula

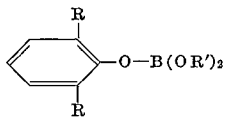

and resorcinol, removing the alcohol produced in the reaction by distillation, and recovering the desired product as the residue, where R is a tertiary alkyl radical of from 4 to 10 carbon atoms, and R' is an alkyl radical of from 1 to 8 carbon atoms.

References Cited by the Examiner

UNITED STATES PATENTS 3,014,061    12/1961    Irish et al. _____ 260—462

FOREIGN PATENTS 864,840    4/1961    Great Britain.

OTHER REFERENCES

Gerrard et al.: J. Chem. Soc. (London), pp. 1529–35 (1959), 260–462.

Wuyts et al.: Bull. Soc. Chem. Belg. 48, 77–93 (1939), Chem. Abst. 260–462, 33, 7274–75.

WILLIAM H. SHORT, *Primary Examiner.*

LOUISE P. QUAST, *Examiner.*

P. HELLER, J. C. MARTIN, *Assistant Examiners.*